(12) United States Patent
Huang

(10) Patent No.: US 6,836,536 B2
(45) Date of Patent: Dec. 28, 2004

(54) CLAMP DEVICE INTEGRATING TEST DEVICE FOR TELEPHONE AND NETWORK CABLES

(76) Inventor: Hobbes Huang, Fl. 3, No. 4, Lane 40, Bo Jue St., Hsi Chin City, Taipei Hsien (TW)

( * ) Notice: Subject to any disclaimer, the term of this patent is extended or adjusted under 35 U.S.C. 154(b) by 348 days.

(21) Appl. No.: 10/171,662

(22) Filed: Jun. 17, 2002

(65) Prior Publication Data

US 2003/0231742 A1 Dec. 18, 2003

(51) Int. Cl.[7] .................................................. H04M 1/24
(52) U.S. Cl. .................... 379/21; 379/27.07; 379/29.11
(58) Field of Search ................................. 379/21, 27.07, 379/29.11, 22.06, 27.01; 324/754, 755, 759, 757, 126, 149; 439/153, 482, 478, 483, 484, 912; 138/90; 7/107, 125, 167, 168, 169, 170

(56) References Cited

U.S. PATENT DOCUMENTS

| | | | | |
|---|---|---|---|---|
| 4,451,947 A | * | 6/1984 | Frieber | 7/107 |
| 4,736,480 A | * | 4/1988 | Bohl et al. | 7/107 |
| 6,091,237 A | * | 7/2000 | Chen | 324/142 |
| 6,205,201 B1 | * | 3/2001 | Prince | 379/27.01 |
| 6,351,865 B1 | * | 3/2002 | De Donato | 7/107 |
| 6,683,460 B2 | * | 1/2004 | Huang | 324/538 |

* cited by examiner

Primary Examiner—Curtis Kuntz
Assistant Examiner—Barry Taylor

(57) ABSTRACT

A clamp device includes a clamp body comprising a clamp head, a stationary holding part extending downwardly from one end of the clamping head, and a driving handle pivotally installed on one side of the clamping head, and an telephone and network cable test device, comprising a main test set and a secondary test set that is installed in a chamber formed on one end of the main test set, wherein the main test set has a case consisting of a first half and a second half, and the first half and the second half cover the stationary holding part of the clamp body, and wherein a front end of the case of the main test set is fixed on the stationary holding part for integrating the telephone and network cable test device with the clamp body.

10 Claims, 4 Drawing Sheets

CLAMP DEVICE INTEGRATING TEST DEVICE FOR TELEPHONE AND NETWORK CABLES

BACKGROUND OF THE INVENTION

1. Field of the Invention

The present invention relates to a handy clamping tool integrating test devices. More particularly, the present invention relates to an improved combined test device for telephone and network cables.

2. Description of the Prior Art

A conventional test kit for internet/ether-net cables generally comprises a main test set and a secondary test tool. When use, the main test set must be applied in conjunction with the secondary test tool. However, as known in the art, the commercial test kit on the market, which as mentioned comprises a main test set and a secondary test tool for testing data transportation quality of these cables, is typically manufactured in the form of a separated structure. In other words, the secondary test tool is not combined with the main test set mechanically. The main drawback of this design is that an inspector or a user usually finds out that one of these two parts of the test kit is missing when he or she needs them to finish cable testing jobs. Moreover, the needed testing tools and materials such as pressing clamps, pressing heads, telephone and network cable test devices, internet cables, and plugs, are typically stored in a tool box which occupies large space and is relatively heavy. This tool box is not convenient for a user or an inspector to carry with him.

First mechanically combined test device for internet cables is disclosed that a secondary test tool is embedded inside of a main test set body. However, it is not convenient when an inspector carries the test device that is large in size. Further, none of the prior art provides a test device integrating above mentioned test tools and materials.

Consequently, there is a strong need in this field to provide a handy test device for telephone and network cables, which has an integrated structure and is relatively small in size.

SUMMARY OF THE INVENTION

It is a primary object of the present invention to provide an improved test device for telephone and network cables.

Another objective of this invention is to provide an improved test device for telephone and network cables which has a clipping mechanism for clipping the test device on a pocket.

Still another objective of this invention is to provide an improved test device for telephone and network cables which is small in size, and therefore it is more convenient to use and carry.

According to the claimed invention, a clamp device integrating test device for telephone and network cables is provided. The clamp device comprises: a clamp body comprising a clamp head, a stationary holding part extending downwardly from one end of the clamping head, and a driving handle pivotally installed on one side of the clamping head; and an telephone and network cable test device, comprising a main test set and a secondary test set that is installed in a chamber formed on one end of the main test set.

The main test set has a case consisting of a first half and a second half, and the first half and the second half cover the stationary holding part of the clamp body, and wherein a front end of the case of the main test set is fixed on the stationary holding part so as to integrating the telephone and network cable test device with the clamp body.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENT

Figure 1:
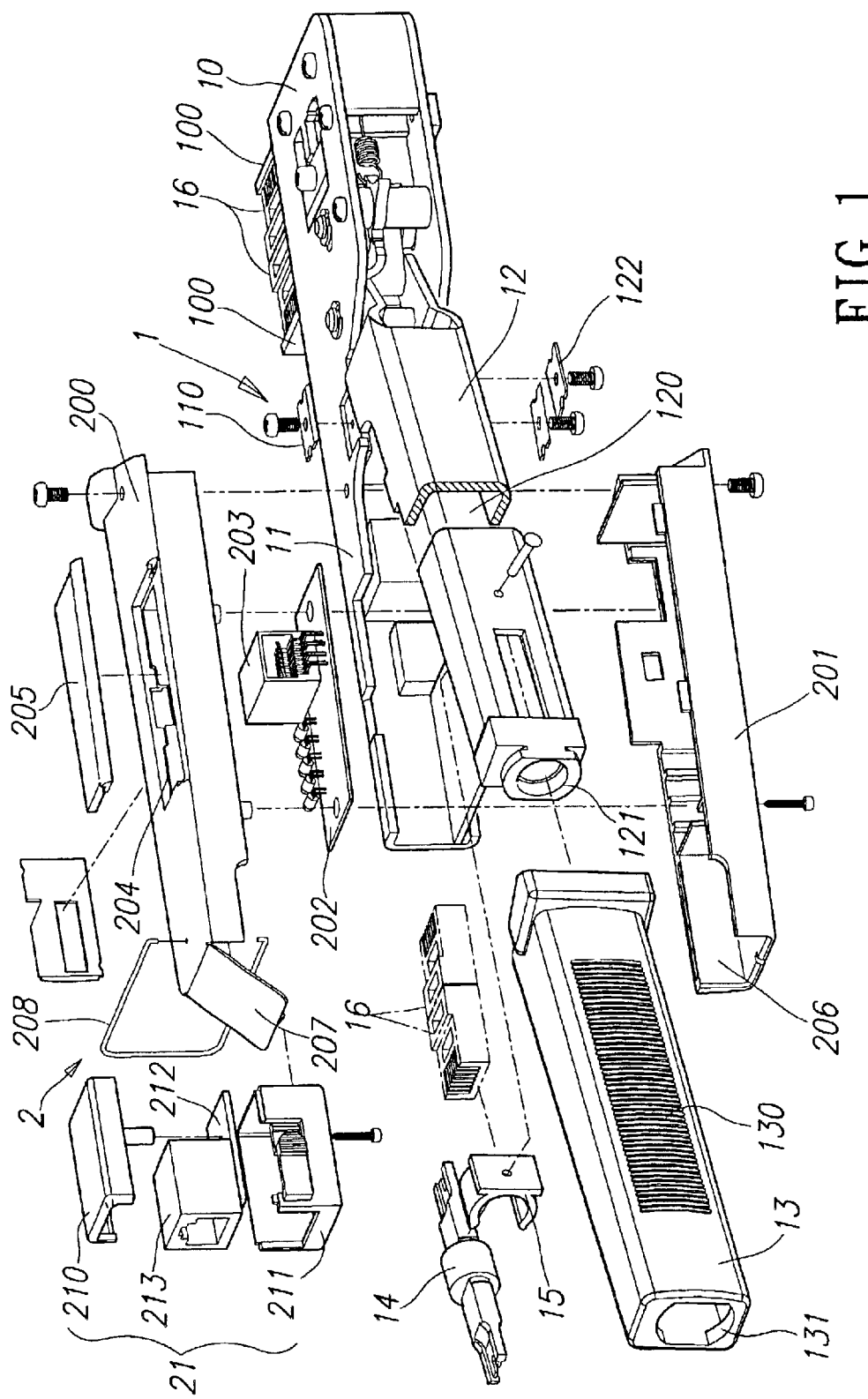
FIG. 1 is an exploded diagram of one preferred embodiment of this invention.
Figure 2:
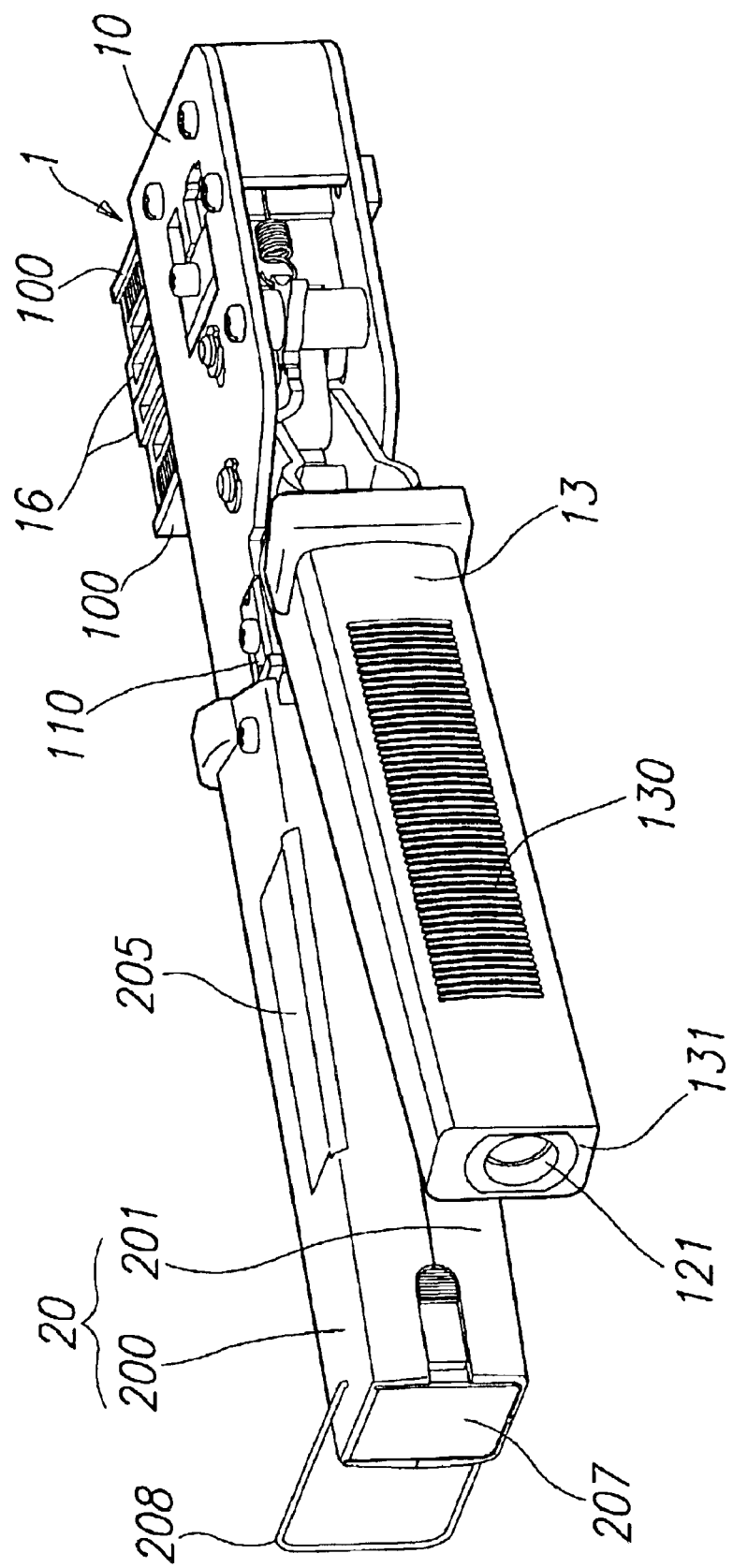
FIG. 2 and FIG. 3 are perspective diagrams of this invention after assembling.
Figure 3:
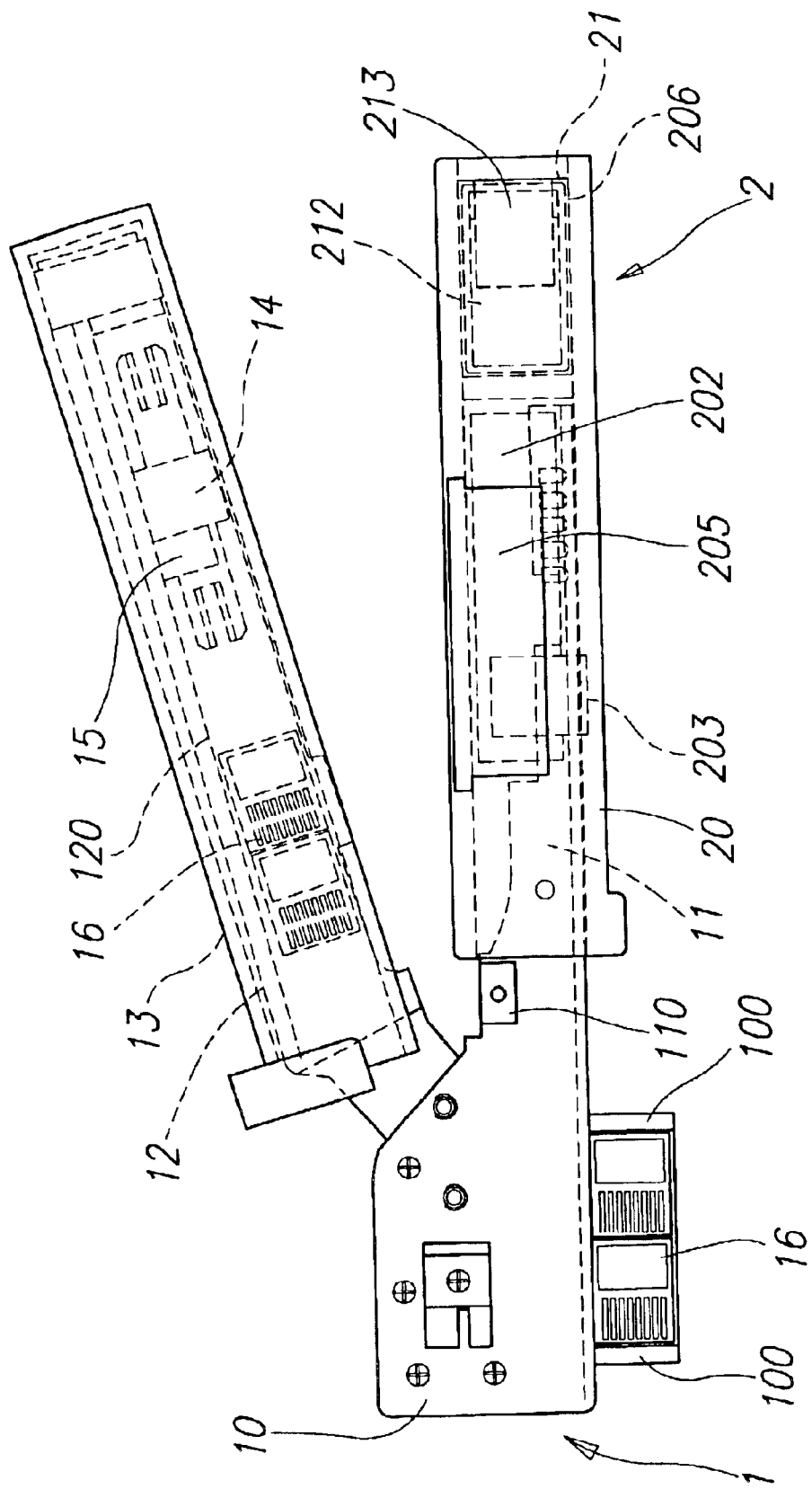

Referring to FIG. 1 to FIG. 3 of the preferred embodiment according to the present invention. FIG. 1 is an exploded diagram of one preferred embodiment of this invention. FIG. 2 and FIG. 3 are perspective diagrams of this invention after assembling. This invention provides an improved test device for telephone and network cables. As shown in FIG. 1 to FIG. 3, the improved test device comprises a clamp body 1 and an telephone and network cable test device 2.

The clamp body 1 comprises a clamping head 10, a stationary holding part 11 extending downwardly from one end of the clamping head 10, and a driving handle 12 pivotally installed on one side of the clamping head 10. A spring (not shown) is disposed between the stationary holding part 11 and the driving handle 12 to keep them in a pre-selected angle. The other parts of the clamp body 10 are similar to a typical clamp and will not be discussed further.

The telephone and network cable test device 2 comprises a main test set 20 and a secondary test set 21. The main test set 20 has a case consisting of a first half 200 and a second half 201 that is screwed on the first half 200. A circuit board 202 and an internet plug 203 are provided in the case of the main test set 20. An opening 204 is provided on the first half 200 for passing a battery. A battery lid 205 is also provided to cover the opening 204. A chamber 206 is provided at the end of the main test set 20.

Likewise, the secondary test set 21 has a case consisting of a first half 210 and a second half 211 that is screwed on the first half 210. A circuit board 212 and an internet plug 213 are provided in the case of the secondary test set 21. The secondary test set 21 is installed in the chamber 206 of the main test set 20, so as to integrating the main test set 20 and the secondary test set 21.

The main purpose of the present invention is to integrate the clamp body 10 and the telephone and network cable test device 2 together so as to promote the convenience for an inspector when he or she carry this tool. The stationary holding part 11 of the clamp body 1 is covered by the first half 200 and the second half 201 of the main test set 20. A front end of the main test set 20 is fixed on the stationary holding part 11, for example, by screws. According to the present invention, the main test set 20 becomes a part of the clamping tool, thereby achieving the goal of improving the convenience for carrying this tool. Optionally, a protection sleeve 13 may be provided on the driving handle 12 of the clamp body 1. A slide prevention pattern 130 may be provided on the protection sleeve 13.

Figure 4:
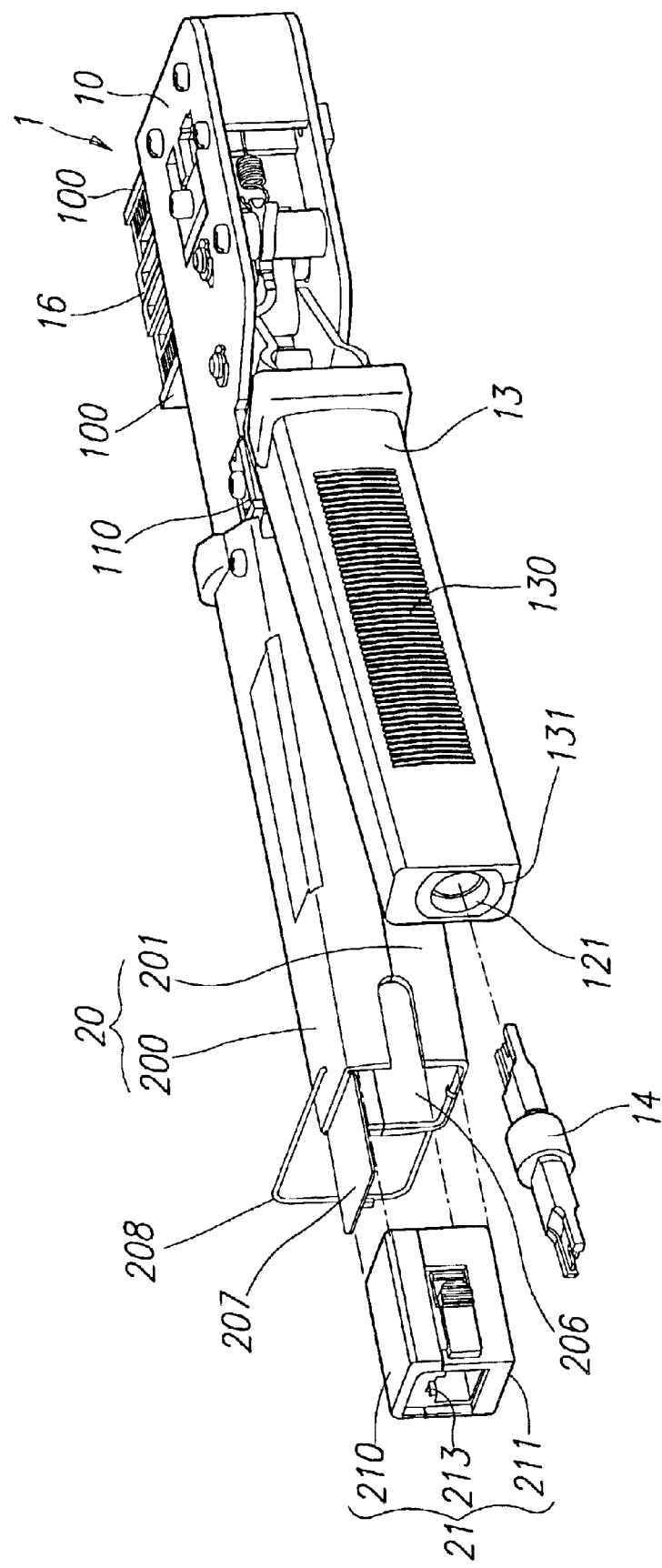
FIG. 4 is a side view illustrating this invention.

Referring to FIG. 4 with reference to FIG. 1 and FIG. 3, according to a second preferred embodiment of the present invention, at least one pressing head 14 may be installed on an interior surface of the driving handle 12 of the clamp body 1. A receiving space 120 is provided on the interior surface of the driving handle 12 and a buckling piece 15 is installed therein. When the pressing head 14 is stored in the receiving space 120, the buckling piece 15 buckles the pressing head 14. An insertion slot 121 is provided at a rear end of the driving handle 12 for inserting the pressing head 14. An associated slot 131 is formed on the protection sleeve 13. By this configuration, when implementing a test operation, an inspector can simply take off the pressing head 14 from the buckling piece 15 and then quickly insert the pressing head 14 into the insertion slot 121 of the driving handle 12 without the need of searching such materials in a heavy tool box.

Still referring to FIG. 1, FIG. 3 and FIG. 4, according to a second preferred embodiment of the present invention, the rest parts of the buckling piece 15, for example, an internet plug 16, are installed on one side of the clamping head 10 of the clamp body 1 and the receiving space 120 of the driving handle 12. A pair of snapping pieces 100 is provided on one side of the clamp head 10. The spacing between the pair of the snapping pieces 100 is designed to allowing the embedding of the internet plugs 16 (two internet plugs are provided in the preferred embodiment). The receiving space 120 of the driving handle 12 that is installed the rest parts of the buckling piece 15 may accommodate two extra internet plugs. By this configuration, the clamp body 1 can store at least four internet plugs 16.

Referring to FIG. 1 to FIG. 4, a lid 207 is connected to the rear end of the main test set 20 of the telephone and network cable test device 2. The lid 207 can cover the opening of the chamber 206 to protect the secondary test set 21. Further, a U shape ring 208 may be pivotally installed on the end of the main test set 20. The U shape ring 208 is used to restrain the driving handle 12. Knife portions 110 and 122 are also provided on the interior surfaces of the stationary holding part 11 and the driving handle 12 respectively for cutting cables or peeling off the cables.

In short, the present provides a handy combined test device that has a clamp body. The combined test device for telephone and network cables has a main test set and a secondary test tool that is integrated with the main test set. Normally, the secondary test tool is locked in the main test set. The combined test device according to this invention is small in size and thus easy to carry.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A clamp device integrating test device for telephone and network cables, comprising:

a clamp body comprising a clamp head, a stationary holding part extending downwardly from one end of the clamping head, and a driving handle pivotally installed on one side of the clamping head; and an telephone and network cable test device, comprising a main test set and a secondary test set, a chamber formed on one end of the main test set, and the secondary test installed in the chamber;

wherein the main test set has a case consisting of a first half and a second half, and the first half and the second half cover the stationary holding part of the clamp body, and wherein a front end of the case of the main test set is fixed on the stationary holding part for integrating the telephone and network cable test device with the clamp body.

2. The clamp device of claim 1 wherein a pair of snapping pieces is provided on one side of the clamp head, and a spacing between the pair of the snapping pieces is used to embedding of internet plugs and sockets.

3. The clamp device of claim 1 wherein a spring is disposed between the stationary holding part and the driving handle.

4. The clamp device of claim 1 wherein knife portions and are provided on the interior surfaces of the stationary holding part and the driving handle respectively.

5. The clamp device of claim 1 wherein a protection sleeve is provided on the driving handle of the clamp body, and a slide prevention pattern is provided on the protection sleeve.

6. The clamp device of claim 1 wherein an interior surface of the driving handle of the clamp body has a receiving space, and at least one pressing head is installed in the receiving space, and an insertion slot is provided at a rear end of the driving handle for inserting the pressing head.

7. The clamp device of claim 6 wherein the chamber is provided on the interior surface of the driving handle and a buckling piece is installed therein.

8. The clamp device of claim 1 wherein a chamber is provided on interior surface of the driving handle for embedding internet plugs and internet sockets.

9. The clamp device of claim 1 wherein a lid connected to one end of the main test set of the telephone and network cable test device covers an opening of the chamber.

10. The clamp device of claim 1 wherein a U shape ring is pivotally installed on the end of the main test set of the telephone and network cable test device.

* * * * *